United States Patent [19]
Zibilich, Jr.

[11] Patent Number: 5,199,659
[45] Date of Patent: Apr. 6, 1993

[54] SEISMIC CABLE RETRIEVAL APPARATUS AND METHOD

[75] Inventor: Anthony M. Zibilich, Jr., Mandeville, La.

[73] Assignee: Shell Offshore Inc., Houston, Tex.

[21] Appl. No.: 688,411

[22] Filed: Apr. 22, 1991

[51] Int. Cl.⁵ .......................... B65H 75/00; F16L 1/12
[52] U.S. Cl. .................................. 242/54 R; 114/254; 254/134.3 SC; 405/173
[58] Field of Search .............. 242/54 R; 226/196, 199, 226/52, 67, 57, 68; 254/134.3 SC, 302, 265; 405/173, 171, 158; 114/253, 254, 310

[56] References Cited

U.S. PATENT DOCUMENTS

| | | | |
|---|---|---|---|
| 3,093,333 | 6/1963 | Bishop | 242/54 R |
| 3,216,636 | 11/1965 | Kothe | 226/1 |
| 3,369,796 | 2/1968 | Guin | 242/54 R |
| 3,788,262 | 1/1974 | Roberts | 114/253 |
| 3,844,129 | 10/1974 | Finlay | 405/166 |
| 4,312,496 | 1/1982 | Norminton | 254/302 |
| 4,313,392 | 2/1982 | Guenther et al. | 114/244 |
| 4,447,013 | 5/1984 | Sandered et al. | 242/54 R |
| 4,529,172 | 7/1985 | Le Comte | 254/134.3 FT |
| 4,596,492 | 6/1986 | Monti et al. | 405/171 |
| 4,714,380 | 12/1987 | Coutarel | 242/54 R X |
| 4,828,223 | 5/1989 | Russell et al. | 254/265 |
| 4,830,300 | 5/1989 | Taylor et al. | 242/54 R |

FOREIGN PATENT DOCUMENTS 0191972 9/1985 Japan ................... 242/54 R

Primary Examiner—Daniel P. Stodola
Assistant Examiner—John F. Rollins
Attorney, Agent, or Firm—Fred S. Reynolds, Jr.

[57] ABSTRACT

A marine cable retrieval apparatus for retrieving marine seismic cable on board a ship which reduces longitudinal tension force on the cable at the cable storage reel when the cable storage reel (drum) is winding up the cable. Marine cable is subject to a tension force which can damage the marine cable when it is placed on a storage reel. The apparatus of this application reduces the tension on a portion of marine cable so that the portion can be retrieved upon a storage reel. The apparatus includes a collar attached to the marine cable and a cable retrievel tool which is placed around the marine cable. The cable retrieval tool has a biasing mechanism which will allow the tool to pass over the collar attached to the marine cable when it is moving away from the ship, but when it is moving toward the ship the biasing mechanism will engage the collar. The cable retrieval tool exerts an opposing force on the collar to the longitudinal tension force on marine cable trailing behind the collar. This reduces the longitudinal tension force on a portion of cable between the cable retrieval tool and the cable storage reel. The cable storage reel can then wind up the portion of cable with a reduced longitudinal tension on the cable at the cable storage reel.

44 Claims, 3 Drawing Sheets

FIG. 4
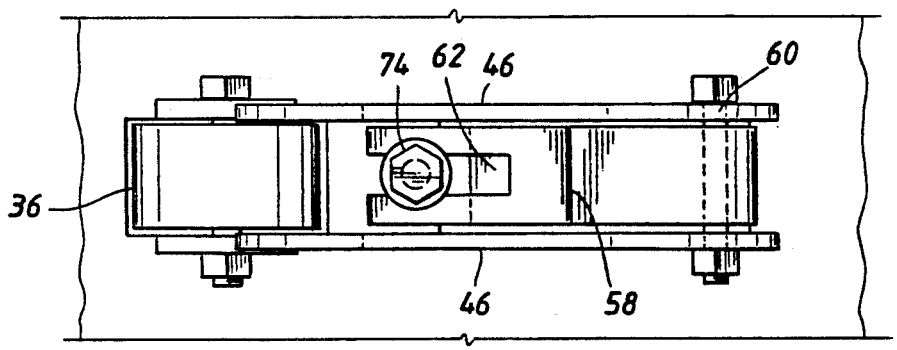
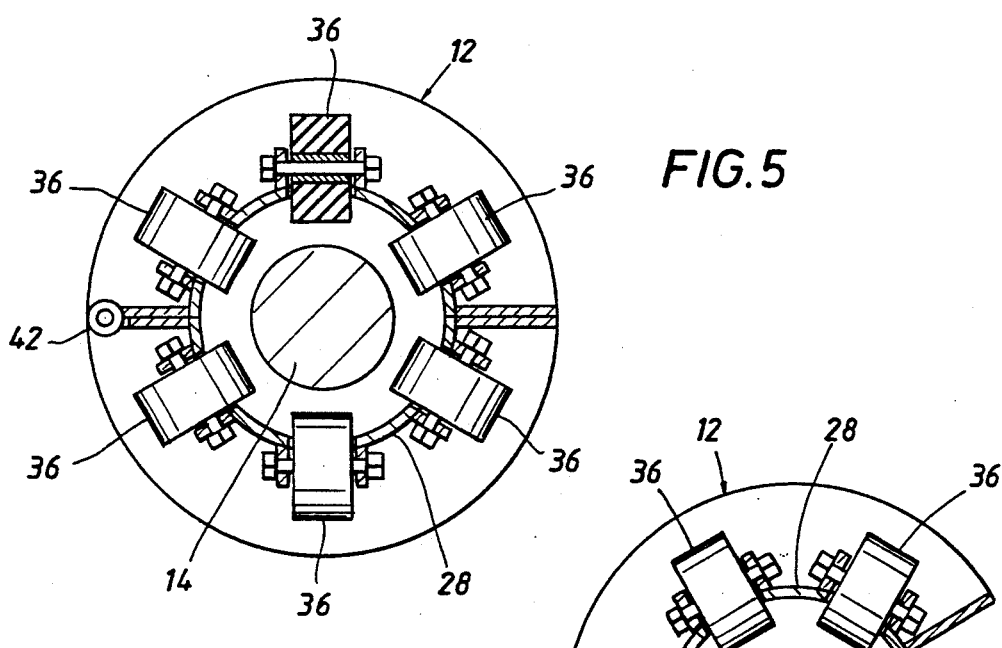
FIG. 5
FIG. 6

SEISMIC CABLE RETRIEVAL APPARATUS AND METHOD

FIELD OF THE INVENTION

The present invention relates generally to marine seismic cable and more particularly, to an apparatus or method to reduce tension on a marine seismic cable during retrieval of the cable from water for placement on a storage reel (drum).

BACKGROUND OF THE INVENTION

Marine seismic exploration is generally conducted by towing a marine seismic streamer cable at a given depth through the ocean or other body of water. However, in some locations due to congestion on the surface or a requirement to detect compressional and shear waves a marine seismic bottom cable is used.

The current practice in marine seismic data collection is to require marine seismic cable of a longer length than was required in the past. For streamer cable, this means a length which could exceed four miles and for bottom cable the length could be equally as long and with an operating depth in excess of 4000 feet. In addition, some seismic data collection techniques require a plurality of marine streamer cables being towed behind a ship at the same time.

A marine cable includes sections of marine cable, usually about 300 feet long, connected together by couplers. In some marine cable designs, each 600 feet, an instrumentation package is connected between sections of marine cable. Each section and each instrumentation package, if it is to be interchangeable, must be able to absorb the cumulative drag force upon the cable when towed in water and if a bottom cable, it must also be able to absorb the weight of the cable between the ship and the bottom.

A marine cable section can absorb this tension force by including longitudinally within the cable section stress members which connect to the couplers to transfer the drag and weight forces on that cable section to the next section of marine cable until finally at the connection to the ship, the drag force on the cable is received as a cumulative tension force on the cable.

In the case of the instrumentation package connected between two couplers, the drag and weight forces are transferred from the trailing coupler, which is linked to stress members of the trailing section of seismic cable, through the body of the instrumentation package to the connecting coupler of the next section of marine cable.

Longer cable or cable which can operate at greater depths place new demands on marine cable operations. The additional length can be a safety hazard. It takes time to retrieve the marine cable from water. If a storm approaches the crew of the ship could be placed in danger while the marine cable is retrieved. In some cases, because there is not enough time to retrieve the cable the marine cable may have to be towed until the weather subsides or in an emergency, abandoned from the ship with a marker buoy attached to the cable.

The present methods for marine cable retrieval limit the speed at which cable can be retrieved from the water without damaging the cable. In addition marine cable which meets new requirements for additional length or greater operating depth face even more sever limitations on the speed at which the marine cable can be retrieved.

The problem is the tension on the cable as the cable is wound on the cable storage reel. This can be explained using the retrieval of a streamer cable. A streamer cable, especially if it is being towed with other equally long cables, is retrieved during towing to keep the cables separated and also to speed the departure of the ship from the area. However, the towing does exert a drag force on the cable which is proportional to the length of the cable. This force is seen at the cable reel as a longitudinal tension force on the cable.

Streamer cable sections can be as much as 4 inches in diameter. They are usually made with an outer layer of polyurethane tube which is supported by spacers and the tube is filled with oil or some other nonconducting liquid to provide buoyancy to the marine cable.

The streamer cable is fragile and flexible at the surface. When the cable is wound on a cable storage reel, the longitudinal tension force on the cable, as the cable goes on the storage reel, is also converted to a transverse force which squeezes the cable. This transverse force which squeezes the cable also migrates down within the layers of the cable on the storage reel as the cable winds on the reel because the longitudinal tension force acts to tighten the cable as the cable is wound on the storage reel. The friction between the layers of wound cable acts to retain the longitudinal tension force. This causes the transverse force to build up as the cable is wound on the cable reel because each layer of wound cable also exerts a force on the underlying cable. Consequently, the transverse force is cumulative. The lower layers of cable on the reel are subjected to an increasingly greater force squeezing across the diameter of the cable. Under this cumulative transverse force, the cable could rupture, spilling oil and collapsing, damaging the internal components of the cable.

A bottom cable has a similar construction as the streamer cable and undergoes the same process when placed on a storage reel, the major difference is that a large component of the tension on the bottom cable at the cable storage reel is the weight of the cable between the ship and the bottom. This weight can be substantial, especially, when it is added to the drag force on the cable as it is moved upward through the water to produce the cumulative longitudinal force on the cable at the cable storage reel.

The tension on the cable at the storage reel could be reduced by: reducing the towing speed of the streamer cable as it is being retrieved; slowing the rate at which the cable storage reel winds up cable; or using sheaves.

As mentioned, reducing the towing speed is one method now used to retrieve streamer cable. However, to reduce the tension to an acceptable level at the cable reel, the longer the cable, the more the towing speed must be reduced. If towing speed is reduced too much, it can lead to the tangling of multiple streamer cables. This will also delay the departure on the ship from the area in the event of a storm or a change in exploration plans.

Reducing the take-up speed on the cable storage reel is another method to compensate for longer cable. Especially, bottom cable where tension on the cable storage reel is a combination of the weight of the cable and the drag force on the cable. However, when the cable storage reel retrieval speed is reduced, it increases the time necessary to retrieve the cable. In addition, when retrieving bottom cable, since a major portion of the longitudinal force is the weight of the cable suspended beneath the ship, a reduction in speed will not appreciably reduce the longitudinal tension force at the cable storage reel.

The problem could be solved if the cable storage reel could be isolated from the longitudinal tension force on the cable. Sheaves have traditionally been used with a cable to perform this function. However, sheaves have proven not to be effective in reducing tension forces on a marine cable at the cable reel because: (1) the diameter of the marine cable can vary along its length due to the various types of instrumentation packages which can be placed on the cable, (2) connecting couplers which link streamer cable sections and instrumentation packages together to form a streamer cable may have a diameter greater than the streamer cable, and (3) in order for sheaves to reduce the tension applied at the cable reel, it must exert a force transverse to the length of the streamer cable. However, current designs of marine cable can not withstand a transverse force on the outer surface because the outer surface is flexible. The outer surface is supported by spacers and a fluid within the cable. Consequently, sheaves can not exert enough force at a single point on the cable to counter balance the longitudinal tension force upon a marine cable at the cable reel.

One approach to solving this problem is found in U.S. Pat. No. 4,828,223, Cable Handling Apparatus, issued on May 9, 1989 to Russel and Gjestrum. The Cable Handling Apparatus overcomes many of the above mentioned disadvantages of using sheaves by using a series of sheaves which encounter the marine cable at several different locations along its length. The invention can also accommodate varying diameters of the cable with each sheaves in turn absorbing some of the tension caused by the drag force on the cable. However, a device of this nature has a complex pneumatic control system. In addition, it is large and bulky thereby taking up considerable space aboard a ship.

A simpler approach is desired to reduce the longitudinal tension at the storage reel or to isolate the longitudinal tension force from the cable storage reel during cable retrieval operations so that marine cable retrieval can be performed quicker and within tension levels at the storage reel which will not damage marine cable.

SUMMARY OF THE PREFERRED EMBODIMENT

It is a purpose of the present invention to provide a marine cable retrieval apparatus which will not limit the speed of a storage reel in retrieving marine streamer cable during towing operations or when the ship is retrieving marine bottom cable.

Another purpose is to provide a method to reduce the longitudinal tension force on marine cable at the storage reel as the cable is wound on the cable storage reel in order to prevent damage to the marine cable.

An additional purpose is to provide an apparatus which will reduce the tension force on marine cable at the storage reel during retrieval operations which can operate with standard shipboard equipment and take up little deck area when in operation or storage.

In accordance with the purposes of the present invention, there is provided a marine cable retrieval apparatus. In the preferred embodiment, the cable retrieval apparatus includes a collar and a cable retrieval tool operating with standard shipboard equipment for the retrieval of marine cable. The standard shipboard equipment used in conjunction with the preferred embodiment of the present application includes a marine cable storage reel (drum) which is connected to the marine cable and a line hoist which is connected to the cable retrieval tool.

Collars are attached to a marine cable at appropriate intervals, usually about each 600 feet of marine cable. A collar works in conjunction with the cable retrieval tool as a means for gripping the cable.

The cable retrieval tool in the preferred embodiment includes a sleeve. The sleeve is placed around the marine cable. A line is attached between the forward end of the cable retrieval tool and the line hoist. The cable retrieval tool is then placed in the water with the attached line maintained in a slack condition. The cable retrieval tool is allowed to move away from the ship along the marine cable due to the drag force of the water upon the cable retrieval tool until the cable retrieval tool passes the first collar attached to the marine cable. At that point, the attached line is placed under tension by activation of the line hoist to pull the cable retrieval apparatus back toward the ship.

The cable retrieval apparatus includes a biasing mechanism which allows the cable retrieval tool to pass over collars attached to the marine cable when moving in a direction away from the ship. However, when the cable retrieval tool is moving toward the ship, the biasing mechanism will not pass over the collar. Consequently, when the cable retrieval tool moves forward along the marine cable, the biasing mechanism engages the collar. Since the biasing mechanism can not move over the collar, in the preferred method to reduce the tension on the cable at the cable reel, the forward motion of the cable retrieval tool pulls the marine cable behind the collar forward toward the ship.

This isolates a portion of the marine cable ahead of the collar from the tension force on the marine cable behind the collar. This also creates in the isolated section a slack length of marine cable between the collar and the cable storage reel aboard the ship. The storage reel can then take in the slack length of marine cable. The line hoist by pulling the cable retrieval tool toward the ship maintains the slack length of cable as the storage reel takes up the cable.

In an alternate method to reduce tension on the cable at the cable reel, the line tension at the collar can be adjusted such that it does not overcome the longitudinal tension force on the cable trailing behind the collar but does substantially reduce the longitudinal tension force seen by the cable at the cable reel. In using this method the line and the cable are taken aboard ship at the same rate while maintaining the line tension on the cable retrieval tool at the collar.

Included as features on the preferred embodiment of the cable retrieval tool are: a flared forward end piece which is attached to the sleeve to enhance the drag force that pushes the cable retrieval tool down the marine cable away from the ship; a flared end piece (also acting to enhance the drag force) and a flared rear end piece which are attached to the sleeve to reduce the possibility of damage to the marine cable during heavy seas; friction reduction mechanisms which reduce the friction between the marine cable, the sleeve and the biasing mechanism as the cable retrieval tool moves along the marine cable; guards extending from the sleeve which prevent the line from tangling on the cable retrieval tool; and a biasing configuration which ensures that a part of the mechanism does not get stuck within the cable retrieval tool in a manner that would prevent operation of the biasing mechanism.

These and other objects and advantages of the present invention will no doubt become apparent to those skilled in the art after having read the following detailed description of the preferred embodiment which is contained herein and illustrated by the various drawing figures.

The invention encompasses the heretofore described preferred embodiment as well as the other embodiments as are described hereinafter and as will be apparent to those of skill in the art.

BRIEF DESCRIPTION OF THE DRAWINGS

FIG. 4 is a top perspective view of the embodiment shown in FIG. 2 taken at section 4—4 of guards which serve as a mount for a roller and a pivot, and for protecting the biasing mechanism of the present invention;

FIG. 5 is a cut away view of the embodiment shown in FIG. 2 taken at section 5—5 looking toward the rear end of the preferred embodiment;

FIG. 6 is the same view of the embodiment shown in FIG. 5 with the embodiment opened to show encirclement of a marine cable;

DETAILED DESCRIPTION OF THE PREFERRED EMBODIMENT

Figure 1:
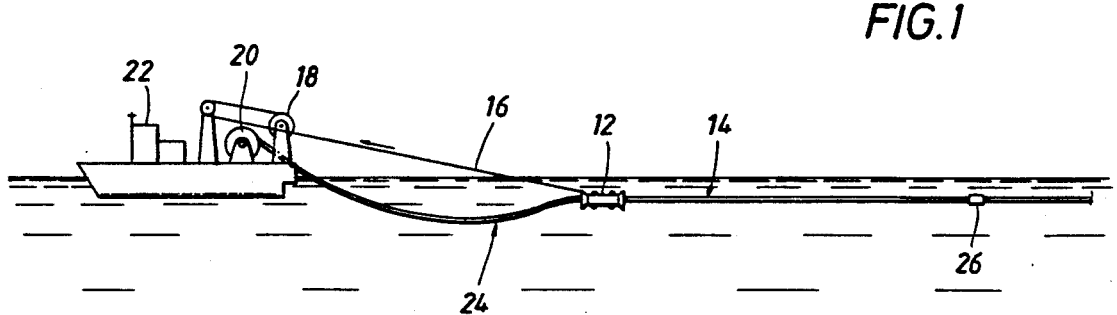
FIG. 1 is a schematic pictorial of a ship towing a marine cable with a preferred embodiment of the present invention on the marine cable.

Referring to FIG. 1, a preferred embodiment of the present invention is illustrated as it would be used in the preferred method to isolate a portion of marine marine cable from a tension force on the marine cable so that the isolated portion of marine cable may be retrieved from the water without a limitation on the speed of the operation of the cable storage reel or a limitation on the speed of towing during retrieval due to excessive tension force at the cable storage reel.

In FIG. 1, a cable retrieval tool is 12, is shown surrounding marine cable 14 with a line 16 connected between the cable retrieval tool 12 and a line hoist 18. A cable storage reel 20 (drum) is shown connected to one end of marine cable 14 and the cable storage reel 20 is located along with line hoist 18 aboard a ship 22 towing marine cable 14. Line 16 is shown connected to what will be referred to in this application as the forward end of cable retrieval tool 12, that is, the end of the cable retrieval tool facing the cable storage reel 20.

FIG. 1 also shows a portion of marine cable 14 which is upstream of cable retrieval tool 12 as a slack length of cable 24. Also illustrated is a collar 26 attached to marine cable 14 shown located downstream of cable retrieval tool 12.

The collar 26 is attached at appropriate intervals, usually around 600 feet, to the marine cable 14. The purpose of the collar is to provide, when working in conjunction (not shown in FIG. 1, to be shown hereinafter) with cable retrieval tool 12, a means for gripping the cable.

The collar 26 must be located at a point on the marine cable where it can absorb the tension on the trailing portion of marine cable without damaging the cable. Preferably, the collar has a diameter greater than the cable, i.e. the collar is shaped to rise above the point of the cable that it is attached to and the collar is also shaped at its engagement surface to be compatible to the means for engaging the collar on the cable retrieval tool 12. Since a marine cable can be several miles long, it is necessary to attach several collars to the cable to retrieve the entire marine cable 14.

Marine cable 14 is usually made up of sections of cable and instrumentation packages which are joined together to form the marine cable 14. The joining is usually done by a connecting coupler. Since the connecting coupler is designed to absorb the tension force on the trailing sections of cable and to transfer this tension to the forward sections of cable, the coupler is an ideal location to attach a collar to the marine cable.

Instrumentation packages also offer a good location to attach the collar to the cable because the body of an instrumentation package is also used to transfer tension forces along the marine cable. In addition, an instrumentation package does not bend, therefore it offers a solid support for the collar. Also, the exterior housing of the instrument package can be designed and fabricated to perform the function of a collar which will work in conjunction with a cable retrieval tool.

FIG. 1 is a illustration of the retrieval of a marine streamer cable being towed. The principle of operation of the present invention would be the same when used for the retrieval of bottom cable.

In accordance with FIG. 1, the preferred embodiment of this present application operates in the following manner. The cable retrieval tool 12 is placed around marine cable 14 with line 16 attached. Cable retrieval tool 12 is then placed in the water with cable retrieval tool 12 being pushed along marine cable 14 away from ship 22 due to the drag force of the water on the cable retrieval tool 12.

Line 16 is maintained in slack condition until cable retrieval tool 12 passes over the first collar 26 attached to cable 14. Line 16 is then taken in. This causes cable retrieval tool 12 to move toward ship 22 along marine cable 14 and to encounter the first collar (not shown in the illustration of FIG. 1). The cable retrieval tool 12 is unable to pass over the collar (to be discussed hereinafter); therefore, in the preferred method of reducing the longitudinal tension force on the cable at the storage reel, line hoist 18 absorbs the tension force of marine cable 14 which trails behind cable retrieval tool 12, thus isolating the portion of cable between collar 26 and cable storage reel 20 from the longitudinal tension force of the trailing cable.

As line 16 continues to be taken in, cable retrieval tool 12 is moved toward the ship pulling the portion of marine cable 14 trailing behind the collar toward ship 22. This movement causes the portion of isolated cable to form a slack length of cable 24. The slack length of cable 24 can then be taken up on storage reel 20 free of the longitudinal tension force on the trailing cable. The speed of winding up the slack length of cable 24 is now only limited by the speed of the cable storage reel 20 or the line hoist 18.

FIG. 1 shows how cable retrieval tool 12 can be used to reduce the tension force upon a towed marine cable 14 at the storage reel 20 as the marine cable 14 is being retrieved on ship 22 during towing operations. There is still tension on the cable at the storage reel but the maximum tension imposed on the cable is the maximum length of the isolated portion of cable as the cable storage reel starts to wind it up, usually about 600 feet. The reduction in tension can be substantial, for example, the maximum tension at the cable reel imposed by about 600 feet of cable is much less than the tension resulting from drag on the trailing portion of cable which could be 4 miles long.

There is an alternate method to reduce the longitudinal tension force on the cable at the cable reel, the opposing tension placed on the collar by the cable retrieval tool can be less then the total longitudinal tension on the cable trailing behind the collar. This will also reduce the longitudinal tension force on the cable at the cable storage reel. Using this method the cable and the line are returned to the ship at the same rate so that a constant tension will remain on the cable retrieval tool at the collar.

The cable retrieval tool 12 using either the preferred method or the alternative method must be removed from the collar when it arrives at the ship to go out and grip the next collar. Before the cable retrieval tool is removed, the storage reel is stopped. When the cable retrieval tool is removed and during the time the cable retrieval tool is repositioned to grab the next collar, the cable on the reel is subject to the entire tension force on the trailing cable.

As discussed previously, the longitudinal tension force also exerts a transverse force on the cable where the marine cable is just turning onto the storage reel. Most current designs of marine cable can withstand this transverse force a this point without damage as long as the cable remains stationary on the reel. However, current designs cannot withstand the cumulative effects of this transverse force as the cable is wound on the cable reel under this longitudinal tension because the transverse force is cumulative upon each layer of cable.

In the preferred method to reduce the longitudinal tension force on the cable at the cable storage reel, this effect is prevented when the storage reel is not moving. When the storage reel is not retrieving cable, the friction between the layers of cable on the reel restrict the movement of the cable on the reel. This hinders the longitudinal tension force on the cable from tightening up the cable wound on the storage reel. In this way, the tension and transverse force is limited to the top layers of wound cable.

In addition, in the preferred method the longitudinal tension force only remains on the cable storage reel for a short period of time, it is not constant as required by current methods to retrieve marine cable. Therefore, even if there is some slippage of the wound cable, when the cable retrieval tool again engages a collar, the upper layers of the wound cable are released from the longitudinal tension and transverse force of the trailing cable. The upper layers of cable which have less friction between them can then "relax" so that the tension and transverse force which had been applied to the cable reel are released. Consequently, even though the cable reel is subjected to the full tension force of the trailing marine cable during the repositioning of the retrieval tool, the tension force with the accompanying transverse force do not build up on the cable storage reel to damage the cable.

In using the alternate method to reduce tension on the cable at the cable storage reel, the cumulative transverse force could build up as the layers of cable are placed on the storage reel because the cable storage reel is under constant longitudinal tension, however the opposing force placed upon the collar by the cable retrieval tool does reduce the cumulative effects of the transverse force within the wound cable and will permit the cable to be retrieved faster than using currently available methods.

In some seismic operations, a streamer cable will have its depth controlled by a device called a "bird". The device is attached to the marine streamer cable at lengths approximately 1200 feet apart. The cable retrieval tool could damage the "bird" if it encounters it. "Birds" are usually located approximately 25 feet downstream of an instrumentation package or a coupler. To prevent damage to a bird, the line attached to the retrieval tool is marked to indicate how far along the cable the cable retrieval tool has moved from the ship. When the line indicates that the cable retrieval tool has passed a collar, the line is pulled in. Attached to the line is a tension gauge to tell the line hoist operator if the cable retrieval tool has engaged the collar. In this manner, damage is prevented to "birds" attached to the marine streamer cable or any other device that may be attached to the cable. The same method of marking the line is used for bottom cable to determine if the cable retrieval tool has traveled far enough along the bottom cable to grab a collar.

Figure 2:
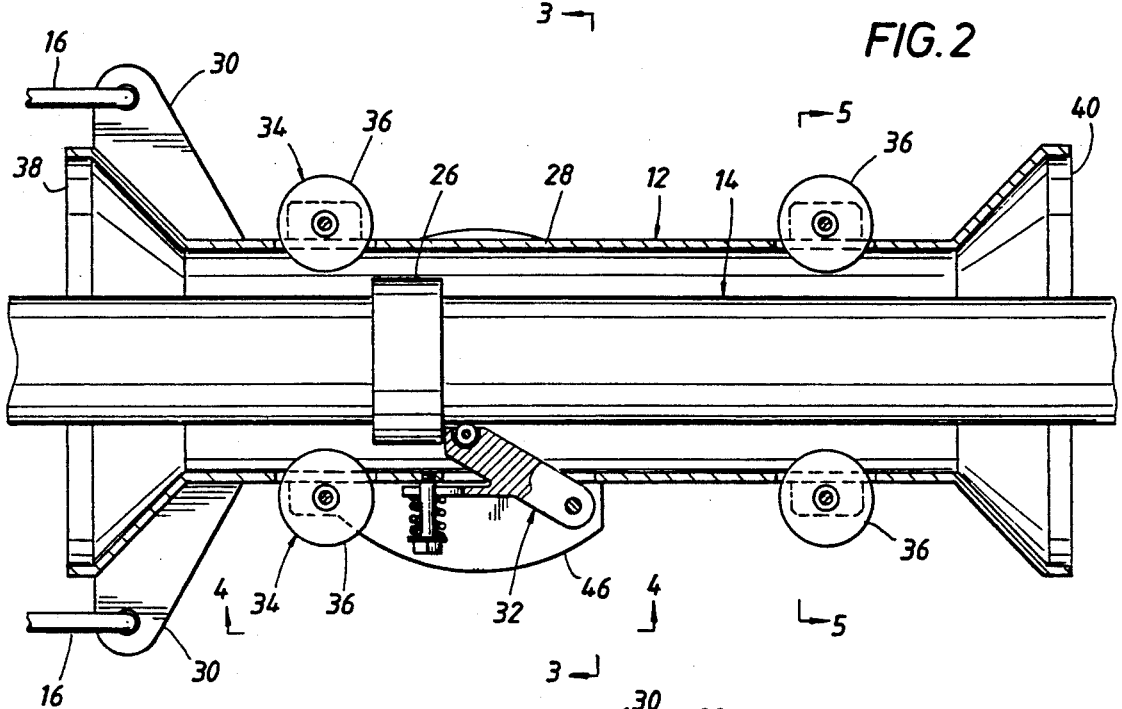
FIG. 2 is a side partial cut away view of the preferred embodiment of the present invention.

Referring now to FIG. 2 a partial cut away view of cable retrieval tool 12 as used in FIG. 1 is shown. In the preferred embodiment cable retrieval tool 12 includes a cylindrical sleeve 28 which surrounds the marine cable 14 and the collar 26. The sleeve 28 is used to guide the cable retrieval tool 12 along the cable and keep the cable retrieval tool 12 from damaging the cable. When cable retrieval tool 12 is used to pull marine cable toward the ship or to provide an opposing force to the longitudinal tension force on the cable trailing behind the collar, the pulling force is not in a direct line with the cable in the water. By using a sleeve, the pulling force is dispersed along the length of the sleeve, thus, preventing the sleeve from kinking the cable.

It should be noted that although the preferred embodiment of the present invention is described herein as having a cylindrical sleeve, it is possible to construct the cable retrieval tool with a shape other than cylindrical across the diameter as long as the internal mechanisms are proportioned to meet the purposes of the hereinafter described mechanisms.

Line 16 can be connected directly to forward end of the cylindrical sleeve 28. However, in the preferred embodiment, shown in FIG. 2, sleeve 28 includes an extension 30 which extends on both sides of the forward end of sleeve 28. Extension 30 is used to connect to line 16. In addition, in the preferred embodiment shown, line 16 is split so that an equal force will be applied to both sides of the forward end of sleeve 28 when tension is applied to line 16. This will help keep the cylindrical sleeve 28 centered on cable 14.

Cable retrieval tool 12 is shown encountering the collar 26 in FIG. 2. A biasing mechanism 32, which is connected to sleeve 28, is shown in contact with collar 26. The biasing mechanism 32 allows the cable retrieval tool 12 when moving along the marine cable 14 in a direction away from the ship to move over the collar 26. However, when cable retrieval tool 12 is moving toward the ship the biasing mechanism will encounter collar 26 and not allow cable retrieval tool 12 to move over collar 26. Consequently, the biasing mechanism by its forward movement engages the collar to absorb the tension force of the marine cable 14 trailing behind collar 26.

As described, the biasing mechanism 32, acts in combination with the collar 26 as a ratchet mechanism. The biasing mechanism 32 can move in only one direction past the collar 26 and when the biasing mechanism 32 tries to move past the collar 26 in the opposite direction, the collar 26 will act as a point where force can be exerted. Which in the case of the present invention, the biasing mechanism 32 exerts force on the collar 26 to reduce the longitudinal tension on the marine cable between the collar and the cable storage reel. In the preferred method to reduce the longitudinal tension force on the cable at the cable storage reel, the cable retrieval tool 12 pulls the marine cable 14 trailing behind the collar 26 toward the ship creating a slack length of cable which is isolated from the longitudinal tension force on the cable trailing behind the collar.

Also shown on FIG. 2, is a sleeve friction reduction mechanism 34 attached to sleeve 28 which reduces friction between sleeve 28 and marine cable 14 as cable retrieval tool 12 moves along marine cable 14. In the preferred embodiment, the sleeve friction reducing mechanism 34 includes rollers 36 which are attached to sleeve 28 and extend within sleeve 28. Other types of sleeve friction reduction means will be apparent to those of skill in the art for reducing friction between the sleeve and the cable, for example, a material could be placed on the interior wall of sleeve 28 which has a low coefficient of friction with respect to marine cable components, or sleeve 28 could have a pattern of protrusions formed on the interior surface to reduce surface contact between sleeve 28 and marine cable 14.

The cable retrieval tool 12 moves away from the ship due to the drag force imposed upon the sleeve 128 as it is towed through the water. However, in the preferred embodiment, shown FIG. 2, a drag enhancement means for increasing the drag force on the cable retrieval tool to propel the cable retrieval tool along the cable away for the ship is shown as flared forward end piece 38. Flared forward end piece 38 is attached to the forward end of sleeve 28. The flared forward end piece presents a larger cross sectional area than the cross sectional area of sleeve 28 to cause an increase in the drag force imposed upon the cable retrieval tool 12.

Other drag enhancement means for propelling the cable retrieval tool along the cable will be apparent to those of skill in the art. For example, anything attached to the sleeve which increases the cross sectional area of the cable retrieval tool to expose a larger area of the tool to the drag force of the water will perform this function. In addition, streamlining the sleeve so that the forward end has a greater resistance to drag force than the rear end, or addition of fins which will maintain the momentum of the sleeve in a direction along the cable will also act to enhance the drag force on the cable retrieval tool.

As discussed heretofore, the length of sleeve 28 acts to guide cable retrieval tool 12 along marine cable 14 and to prevent the marine cable 14 from kinking when the collar 26 is placed under an opposing tension by line hoist 18. However, in rough seas, it is possible for sleeve 28 to damage marine cable 14 because the cable will be subject to being bent against the ends of sleeve 28. A protecting means for protecting the cable from damage due to rapid changes in the position of the cable and rapid changes in water flow near cable retrieval tool 12 is used to prevent this in the preferred embodiment. Along with the flared forward end piece 38, a flared rear end piece 40 is attached to the rear end of sleeve 28. The purpose of both end pieces 38, 40 is to increase the bending radius near the cable retrieval tool about which the marine cable 14 bends. This prevents the cable from bending sharply against the ends of sleeve 28 in rough seas. Other protecting means for protecting the cable in rough seas may be apparent to those of skill in the art, for example a flexible tube could be attached at either or both ends to provide the protection needed.

Figure 3:
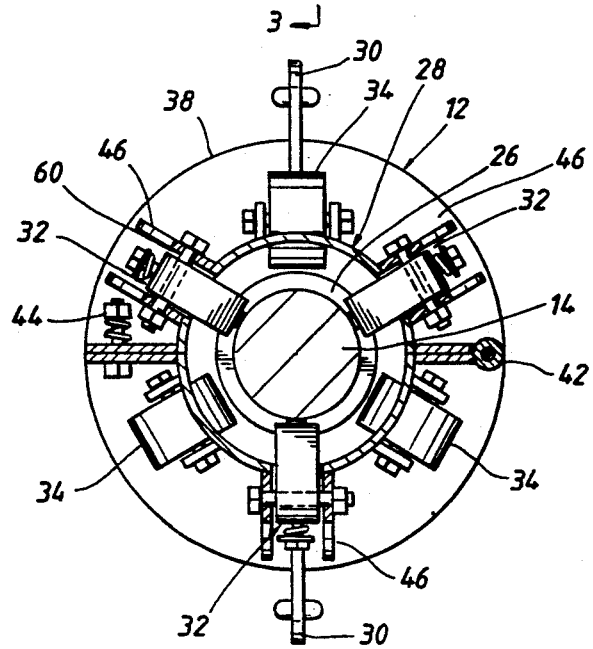
FIG. 3 is a cut away view of the embodiment shown in FIG. 2 taken at section 2—2 looking toward the forward end.

Referring now to FIG. 3, a cross section taken at section 3—3 of FIG. 2 looking toward the forward end of cable retrieval tool 12 is illustrated. Cable retrieval tool 12 is shown to be divided into two longitudinal sections. In the preferred embodiment of FIG. 3, the sections are joined by a hinge 42 and a bolt 44. Other fastening methods will be apparent to those of skill in the art to join the sections such as, but not limited to pins, latches, screws, straps or belts.

FIG. 3 also shows that in the preferred embodiment a plurality of biasing mechanisms 32 are used and they are placed around the circumference of sleeve 28. It is possible to construct the present invention using only one biasing mechanism by locating a wedge shaped surface on one side of the sleeve which would hold one side of the collar while the biasing mechanism holds the other side of the collar or to construct a biasing mechanism which would encompass a large portion of the internal diameter of the sleeve by the use of elastic materials supporting a wedge shaped internal surface.

In the preferred embodiment of FIG. 3, three biasing mechanisms 32 are provided to encounter collar 26 to equalize the force imposed upon collar 26 and cable engagement tool 12 when tension is placed on the line to cause the cable retrieval tool to place an opposing force to the longitudinal tension force on collar 26. More biasing mechanisms or less may be used as long as the biasing mechanism can firmly encounter collar 26 without slipping off when under the pulling force of the line.

FIG. 3 also shows in the preferred embodiment, the sleeve 28 includes guards 46 which extend from the outside circumference of sleeve 28 and are located around the circumference of sleeve 28. Guards 46 act as a protecting means to prevent objects in the water or the line from interfering with the operation of the biasing mechanism. Guards 46 is also shown in FIG. 2.

Referring again to FIG. 3 rollers 36 are shown located along the circumference of sleeve 28. In FIG. 3, some rollers are not shown because biasing mechanism 32 blocks the view, however referring to FIG. 4 a top view of guards 46 taken art section 4—4 of FIG. 2, shows roller 36 located within guards 46 and located behind biasing mechanism 32 with respect to the view presented in FIG. 3. In the preferred embodiment, 6 rollers are used on the forward end, however more of less rollers may be used to reduce friction between sleeve 28 and marine cable 14 as sleeve 28 moves along cable 14.

Referring now to FIG. 5, a cross sectional view looking toward the rear of cable retrieval tool 12 taken at section 5—5 of FIG. 2 shows 6 rollers located around the circumference of sleeve 28 at the rear end of sleeve 28 to reduce friction between the cable 14 and sleeve 28 in the preferred embodiment. Again, more or less rollers may be used to reduce friction between cable retrieval tool 12 and marine cable 14 at the rear end of sleeve 28.

Referring now to FIG. 6, a cross section view showing the same section as FIG. 5 is shown, however FIG. 6 provides a cross section view looking toward the rear of cable retrieval tool 12 with the two longitudinal sections opened to encircle marine cable 14.

Figure 7:
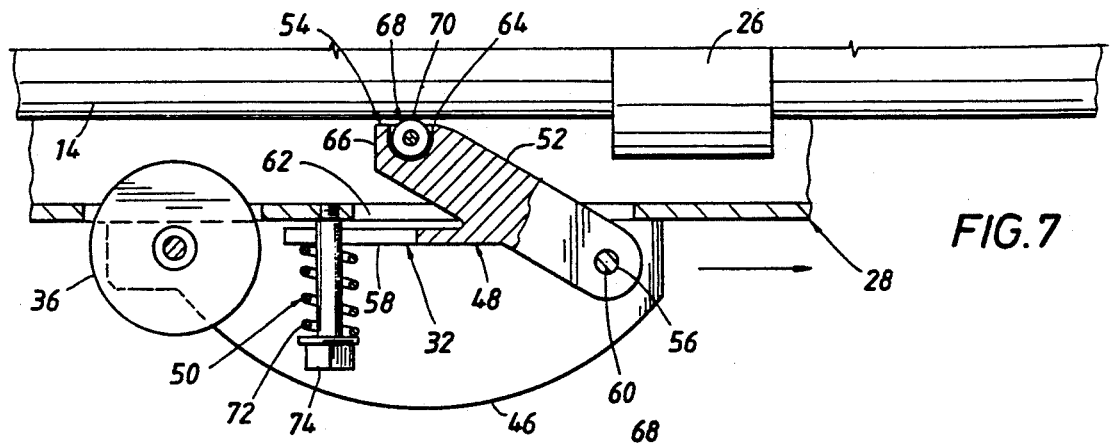
FIG. 7 is a partial cut away enlarged view of the biasing mechanism shown in FIG. 2 to show the operation of the biasing mechanism of the preferred embodiment with the embodiment moving in a direction away from the ship.

Referring now to FIG. 7, the parts associated with biasing mechanism 32 of the preferred embodiment are described. Biasing mechanism 32 includes a levered member 48 under a biasing force 50. The levered member 48 has a levered arm 52, a collar encounter end 54 located on levered arm 52, a passage through levered arm 52 which acts as a pivot point 56 and a bias arm 58 extending from levered arm 52.

The pivot point 56 on levered arm 52 connects to a pivot 60. In the preferred embodiment, the pivot 60 is located on the sleeve where guards 46 extend beyond the outside circumference of sleeve 28. However, it is possible in some arrangements to locate pivot 60 directly on the circumference of sleeve 28.

Levered arm 52 extends through an opening 62 in sleeve 28 at an angle with respect to the center line of sleeve 28 such that collar encounter end 54 extends towards the forward end of sleeve 28. Levered arm 52 also extends to a depth within sleeve 28 such that when a marine cable 14 is positioned at the center of sleeve 28, collar encounter end 54 will have an alignment surface 64 facing marine cable 14 and an engagement surface 66 facing the forward end of sleeve 28.

The alignment surface 64 acts an alignment means for centering the cable 14 within cable retrieval tool 12 so that the biasing mechanism 32 can properly grip the cable 14. The alignment surface 64 rests upon the cable 14 and through connections to the biasing force 50 the alignment surface urges cable 14 into a position so that the engagement surface 66 can engage the collar 26. Other alignment means may be apparent to those of shill in the art, for example an elastic material can be placed on the interior surface of the sleeve which can urge the cable into a position for engagement of the biasing mechanism to the collar.

The engagement surface 66 has a shape which is compatible with the shape of the surface of the collar when the two surfaces are in contact. In FIG. 7 the surfaces are shown as flat, however the contact surface of the collar could have indentations which the engagement surface would fit into to improve the contact and prevent the collar encounter end 54 from slipping off.

Referring again to FIG. 7, a preferred biasing mechanism friction reduction means for reducing friction between the alignment surface 64 and the cable 14 is shown as arm friction reduction mechanism 68 attached to collar encounter end 54. In the preferred embodiment, the arm friction reduction mechanism is a roller 70 attached to collar encounter end 54 and extending through the alignment surface 64 facing marine cable 14.

However, other biasing mechanism friction reduction means may be apparent to those of skill in the art, as examples, coating alignment surface 64 with a material having a low coefficient of friction with respect to marine cable in water or forming a pattern of protrusions on the alignment surface 64 would also reduce the surface contact between the alignment surface 64 and the cable 14 resulting in a reduced sliding friction coefficient.

Again referring to FIG. 7, bias arm 58 extends from levered arm 52 along the outside of sleeve 28 to encounter biasing force 50. In the preferred embodiment of this application shown in FIG. 7, and in FIG. 4, bias arm 58 extends beyond opening 62 so that bias arm 58 will not move within the opening 62 of sleeve 28 and cause levered member 48 to be stuck within sleeve 28 during operations because the bias arm would be unable to rise within the opening 62. Other arrangements are possible, for example, the portion of bias arm 58 which extends above the outside surface of sleeve 28 can be made wider than opening 62, instead of longer than opening 62, to prevent bias arm 58 from moving within sleeve 28 and getting stuck within sleeve 28.

The purpose of bias arm 58 is to interact with biasing force 50 so that levered arm 52 is urged toward the center of sleeve 28.

Again referring to FIG. 7, in the preferred embodiment bias arm 58 connects to biasing force 50. The biasing force 50 exerts a force on the bias arm 58 which is transferred through its connection to levered arm 52 and pivot 56 to constantly urge the collar encounter end 54 to rest against the cable. As mentioned, the collar 26 when moved through the cable retrieval tool in one direction can overcome the biasing force 50 due in part to the angle the levered arm 52 is aligned with respect to the center of sleeve 28. When the sleeve 28 is pulled toward the ship 22, the biasing force 50 assures that the engagement surface 66 will remain in contact with a collar to maintain the engagement of the biasing mechanism 32 to the collar.

In the preferred embodiment, biasing force 50 includes a spring 72 applying a compression force upon bias arm 50 as a result of a bolt 74 which extends through spring 72 and connected to sleeve 28. The bolt 74 holds spring 72 in compression. There are other biasing methods to provide a biasing force 50 which may be know to those of skill in the art, such as such using an elastic material or a different arrangement of bias arm and biasing force. For example, instead of using the arrangement shown in FIG. 7, the bias arm could be located on the opposite side of the levered arm, i.e. behind bias point 60 instead of in from of bias point 60, whereby the biasing force would urge the bias arm away for sleeve 28 in order push the levered arm within sleeve 28.

Referring to FIGS. 7, 8, 9 and 10, the operation of biasing mechanism 32 in the preferred embodiment to allow cable retrieval tool 12 to move over collar 26 when moving in a direction away from the ship and to allow the biasing mechanism to encounter collar 26 when moving in a direction toward the ship is shown.

In FIG. 7, the relative movement of cable retrieval tool 12, as indicated by the arrow in the illustration, is defined for the purposes of this application to be away from the ship. FIG. 7 shows collar encounter end 54 of biasing mechanism 32 to be riding against marine cable 14 with the biasing mechanism 32 moving toward collar 26.

Figure 8:
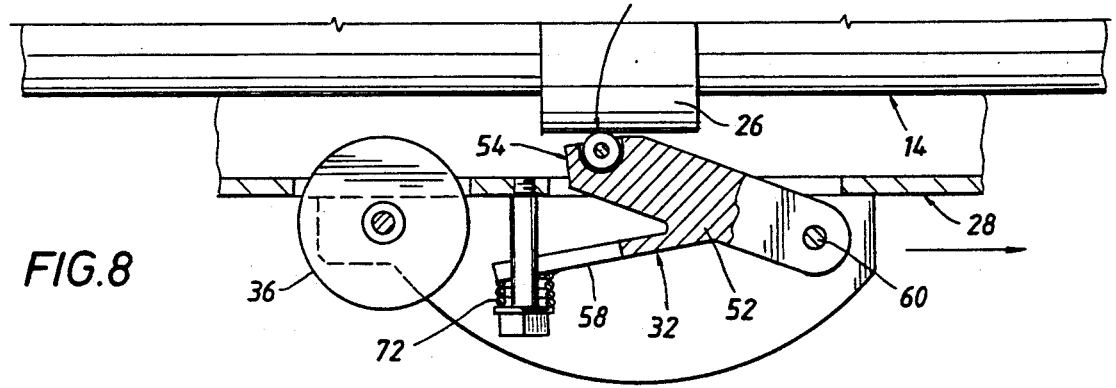
FIG. 8 is the same view as FIG. 7 with the embodiment moving in a direction away from the ship and over a collar.

In FIG. 8, the relative movement of sleeve 28 continues to be away from the ship, however, levered arm 52 has reached collar 26. Due to the angle of alignment of levered arm 52 within sleeve 28, collar 26 causes levered arm 52 to over come the compression force of spring 72 and to move about pivot 60 so that levered arm 52 rises above collar 26 and the relative movement of cable retrieval tool 12 will then take the biasing mechanism 32 past collar 26.

Figure 9:
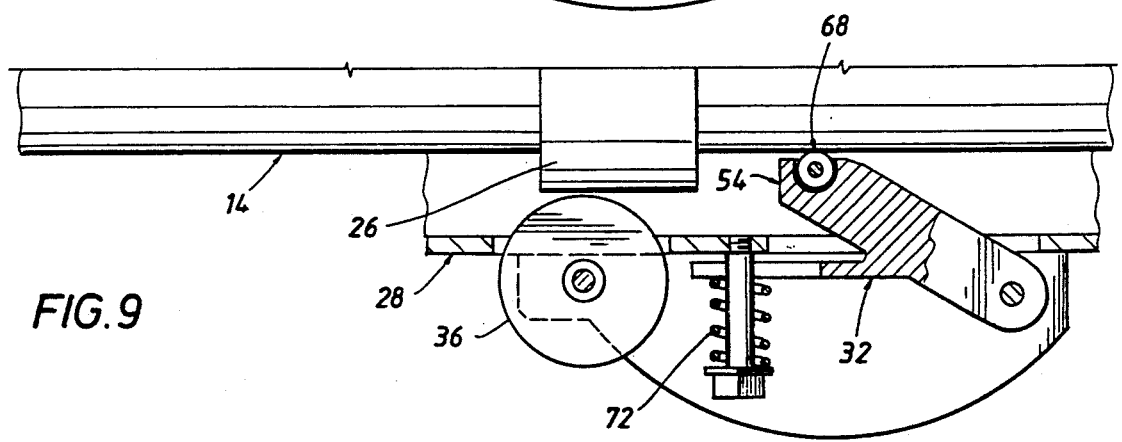
FIG. 9 is the same view as FIG. 7 with the embodiment no longer moving after passing over a collar.

In FIG. 9, biasing mechanism 32 has passed collar 26 and levered arm 32 is urged back against marine cable 14 due to the compression force of spring 72. There is no relative movement of cable retrieval tool 12 in FIG. 9.

Figure 10:
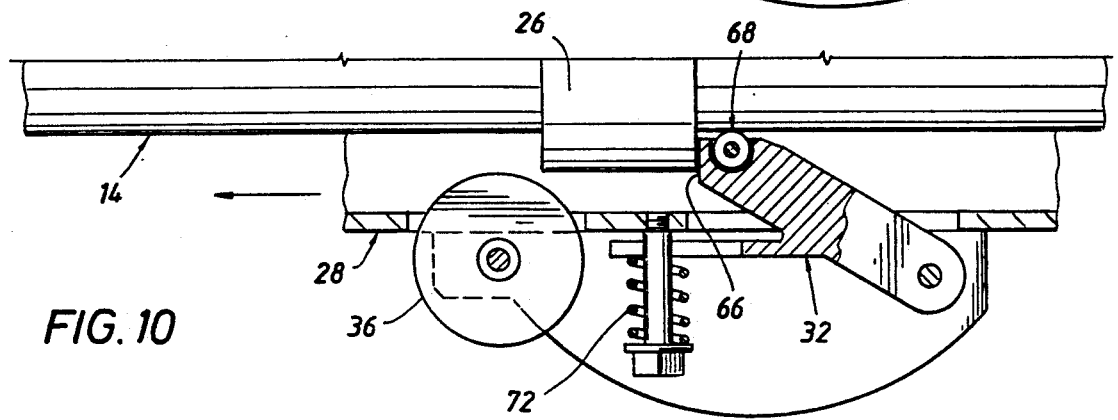
FIG. 10 is the same view as FIG. 7 with the embodiment moving toward the ship and encountering a collar.

In FIG. 10 cable retrieval tool 12 is moving toward the ship and the engagement surface 66 facing the forward end of sleeve 28 encounters collar 26. Levered arm 32 is unable to rise above collar 26 when pulled toward the ship; consequently, if enough tension is placed on the line in the preferred method of reducing tension on the cable at the cable storage reel, the marine cable 14 located behind collar 26 will be pulled forward toward the ship.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method for retrieving marine cable on board a ship which reduces a longitudinal tension force on the cable at the cable storage reel when the cable storage reel is winding up the cable, comprising the steps of:
    (a) attaching a line to a cable retrieval tool;
    (b) sliding the cable retrieval tool along the cable away from the ship;
    (c) preventing damage to the cable by the cable retrieval tool due to kinking of the cable by utilizing a sleeve as a part of the tool to prevent kinking damage, the line being attached to a forward end of the sleeve, the forward end being the end facing the cable storage reel.
    (d) gripping the cable at a predetermined location with the cable retrieval tool;
    (e) pulling on the cable retrieval tool such that the longitudinal tension on the cable between the predetermined location and the cable storage reel is reduced; and
    (f) winding up the cable between the cable retrieval tool and the ship.

2. The method for retrieving a marine cable according to claim 1, wherein step (c) includes aligning the cable within the sleeve to enhance the gripping of the cable.

3. The method for retrieving marine cable according to claim 1, wherein step (c) includes utilizing a friction reduction mechanism for reducing friction between the sleeve and the cable.

4. The method for retrieving marine cable according to claim 1, wherein step (c) includes utilizing rollers attached around the circumference of the sleeve to reduce friction between the sleeve and the cable.

5. The method for retrieving marine cable according to claim 1, wherein step (c) includes utilizing longitudinal sections to form the sleeve, the longitudinal sections being joined to encircle the cable.

6. The method for retrieving marine cable according to claim 1, wherein:
    step (b) includes towing the cable behind the ship and sliding the tool along the cable by subjecting the tool to a drag force of water, the drag force acting to push the tool along the cable away from the ship; and
    step (c) includes increasing the drag force upon the sleeve of the tool to enhance the sliding of the tool along the cable away from the ship.

7. The method for retrieving marine cable according to claim 1, wherein:
    step (b) includes towing the cable behind the ship and sliding the tool along the cable by subjecting the tool to a drag force of water, the drag force acting to push the tool along the cable away from the ship; and
    step (c) increasing the drag force upon the sleeve of the tool to enhance the sliding of the sleeve along the cable away from the ship by utilizing a flared forward end piece attached to the forward end of the sleeve to increase the drag force on the tool.

8. The method for retrieving marine cable according to claim 1, wherein step (c) includes utilizing a cable protection mechanism for preventing the sleeve from bending the cable at the ends of the sleeve whereby the sleeve will not damage the cable due to rapid changes in the position of the sleeve and rapid changes in water flow near the sleeve.

9. The method for retrieving marine cable according to claim 1, wherein step (c) includes utilizing a flared forward end piece and a flared rear end piece, the flared forward end piece being attached to the forward end of the sleeve and the flared rear end piece being attached to the rear end of the sleeve whereby the sleeve is prevented from damaging the cable due to rapid changes in the position of the sleeve and rapid changes in water flow near the sleeve due to the limiting of the amount of bending the cable may undergo because of the flared forward end piece and the flared rear end piece.

10. The method for retrieving marine cable according to claim 1, wherein step (d) includes utilizing a collar and a biasing mechanism to grip the cable, the collar having a diameter larger than the cable and being attached to the cable at the predetermined location where the collar can absorb the tension on the trailing cable, the biasing mechanism being attached to the sleeve and being configured such that when the sleeve is moving in a direction away from the ship the biasing mechanism will pass over the collar and when the sleeve is being pulled toward the ship the biasing mechanism will engage the collar.

11. The method for retrieving a marine cable according to claim 10, wherein step (b) includes utilizing a biasing mechanism friction reduction mechanism for reducing friction between the biasing mechanism and the cable.

12. The method for retrieving marine cable according to claim 10, wherein:
    step (b) includes sliding the sleeve away from the ship until the sleeve passes over the collar; and
    step (d) includes engaging the biasing mechanism to grip the collar by pulling the sleeve with the line toward the ship until the biasing mechanism encounters the collar.

13. The method for retrieving marine cable according to claim 12, wherein step (d) includes utilizing pivots, biasing forces, and levered members for the biasing mechanism, a pivot being located at a plurality of locations around the circumference of the sleeve, a biasing force being located adjacent to each pivot, a levered member being located adjacent to each pivot and being aligned such that it may encounter the collar within the sleeve and connect at one point to the adjacent pivot and at another point to the adjacent biasing force whereby the biasing force urges the levered member toward the center line of the sleeve for encountering the collar.

14. The method for retrieving marine cable according to claim 12, wherein step (d) includes utilizing a pivot, a biasing force, and a levered member for the biasing mechanism, the pivot being attached to the sleeve, the biasing force being located adjacent to the pivot, the levered member being located adjacent to the pivot and being aligned such that it may encounter the collar within the sleeve and connect at one point to the pivot and at another point to the biasing force whereby the biasing force urges the levered member toward the center line of the sleeve for encountering the collar.

15. The method for retrieving marine cable according to claim 14, wherein step (d) includes utilizing a bias arm and a levered arm connected to the bias arm for the levered member, the levered arm having a collar encounter end, a passage passing through the levered arm for a pivot point and a connection with the bias arm, the levered member being aligned such that the levered arm is angled within the sleeve such that the collar encounter end of the levered arm extends toward the forward end of the sleeve, the bias arm extends toward the biasing force, the pivot point connects to the adjacent pivot and the bias arm connects to adjacent biasing force.

16. The method for retrieving a marine cable according to claim 15, wherein step (d) includes utilizing an engagement surface and an alignment surface on the collar encounter end of the levered arm to guide the cable within the sleeve and to enhance the engagement of the collar encounter end to the collar, the engagement surface having a shape such that, when the collar encounter end is engaging the collar, the engagement surface in contact with the collar surface will align with the collar surface, and the alignment surface being configured such that the alignment surface rests upon the cable whereby the alignment surface will as a result of the biasing force acting on the levered arm through the pivot urge the cable to align within the sleeve for engagement by the biasing mechanism.

17. The method for retrieving a marine cable according to claim 16, wherein step (d) includes utilizing a biasing mechanism friction reduction mechanism for reducing friction between the alignment surface and the cable.

18. The method for retrieving a marine cable according to claim 16 wherein step (d) includes utilizing a roller attached to the alignment surface for reducing friction between the alignment surface and the cable.

19. The method for retrieving marine cable according to claim 15, wherein step (d) includes utilizing the biasing force and the bias arm on the outside of the sleeve, the biasing force being located on the outside of the sleeve and adjacent to the pivot, the bias arm being extended outside the sleeve and connected to the biasing force whereby the biasing force urges the collar encounter end toward the center line of the sleeve.

20. The method for retrieving marine cable according to claim 19, wherein step (d) includes utilizing guards which extend from the outside circumference of the sleeve, the guards being located adjacent to the biasing force to protect the biasing force and the bias arm by preventing an object in the water or the line from interfering with the operation of the biasing force and the bias arm.

21. The method for retrieving a marine cable according to claim 20, wherein step (d) includes utilizing the guards as a location adjacent to the biasing force to attach the pivot.

22. A method for retrieving marine cable on board a ship which reduces a longitudinal tension force on the cable at the cable storage reel when the cable storage reel is winding up the cable, comprising the steps of:
(a) attaching to the cable a collar at a predetermined location;
(b) attaching a line between the ship and a forward end of a cable retrieval tool, the forward end being the end of the cable retrieval tool that faces the cable storage reel;
(c) sliding the cable retrieval tool along the cable away from the ship over the collar;
(d) gripping the collar with a biasing mechanism is a part of the cable retrieval tool by pulling the line toward the ship such that the biasing mechanism contacts the collar;
(e) pulling the cable retrieval tool toward the ship to form a slack length of cable between the cable retrieval tool and the cable storage reel; and
(f) winding up the slack length of cable.

23. An apparatus for retrieving marine cable on board a ship which reduces a longitudinal tension force on the cable at a cable storage reel when the cable storage reel is winding up the cable, comprising:
(a) a collar attached to the cable at a location where the collar is functional to absorb the tension force on the cable trailing behind the collar;
(b) a cable retrieval tool encircling the cable;
(c) a biasing mechanism which is a part of the cable retrieval tool and is functional to allow movement of the cable retrieval tool along the cable in a direction away from the storage reel and over the collar and movement toward the storage reel until the biasing mechanism encounters the collar; and
(d) a line attached between the ship and a forward end of the cable retrieval tool, the forward end being the end of the cable retrieval tool that faces the cable storage reel, the line is operative to apply a tension on the cable retrieval tool such that tension applied on the line pulls the cable retrieval tool toward the ship whereby the biasing mechanism engages the collar, and by applying an additional tension force on the line, an opposing force is place on the collar which opposes the longitudinal tension force on the cable trailing behind the collar thereby reducing the longitudinal tension force on the length of cable between the cable storage reel and the cable retrieval tool so that the cable storage reel can then wind up the length of cable between the cable retrieval tool and the cable storage reel.

24. The apparatus for retrieving marine cable according to claim 23, further comprising a biasing mechanism friction reduction means for reducing friction between the biasing mechanism and the cable.

25. The apparatus for retrieving marine cable according to claim 23, wherein the cable retrieval tool includes a sleeve which is functional to prevent the cable from kinking and the line is attached to the forward end of the sleeve, the forward end being the end facing the cable storage reel.

26. The apparatus for retrieving marine cable according to claim 25, wherein the sleeve includes longitudinal sections whereby the sections are joined to encircle the cable.

27. The apparatus for retrieving marine cable according to claim 25, further comprising a sleeve friction reduction means for reducing friction between the sleeve and the cable.

28. The apparatus for retrieving marine cable according to claim 25, further comprising rollers, the rollers are attached to the sleeve and act to reduce friction between the sleeve and the cable.

29. The apparatus for retrieving marine cable according to claim 25, further comprising a drag enhancement means for increasing a drag force of water upon the sleeve of the tool when the ship is towing the cable, the drag force on the sleeve acting to push the tool along the cable away from the ship, the drag enhancement means being functional to increase the drag force on the sleeve to propel the cable retrieval tool along the cable and away from the ship.

30. The apparatus for retrieving marine cable according to claim 25, further comprising a flared forward end piece which is attached to the forward end of the sleeve whereby the flared forward end is functional to increase the resistance of the cable retrieval tool to water flow resulting in a greater drag force on the tool to propel the cable retrieval tool away from the ship.

31. The apparatus for retrieving marine cable according to claim 25, further comprising a protecting means for protecting the cable from damage due to rapid changes in the position of the sleeve relative to the position of the cable and rapid changes in water flow near the sleeve.

32. The apparatus for retrieving marine cable according to claim 25, further comprising a flared forward end piece and a flared rear end piece, the flared forward end piece being attached to the forward end of the sleeve and the flared rear end piece being attached to a rear end of the sleeve whereby the flared forward end piece and the flared rear end piece are functional to increase the bending radius of the cable near the ends of the cable retrieval tool thereby preventing bending damage to the cable due to rapid changes in the position of the cable retrieval tool relative to the cable and rapid changes in the flow of water near the sleeve.

33. The apparatus for retrieving marine cable according to claim 25, wherein the biasing mechanism includes a biasing force and a levered member.

34. The apparatus for retrieving marine cable according to claim 33, wherein:
(a) the levered member includes a levered arm and a bias arm;
(b) the levered arm has a collar encounter end, a passage through the levered arm for a pivot point and a connection to the bias arm;
(c) the sleeve has a pivot located on the circumference of the sleeve;
(d) the biasing force is located adjacent to the pivot;
(e) the levered member is aligned with the sleeve such that the collar encounter end of the levered arm extends toward the forward end of the sleeve and toward the center of the sleeve and the bias arm extends toward the biasing force;
(f) the pivot point of the levered arm is connected to the pivot; and
(g) the bias arm is connected to the biasing force such that the biasing force is functional to urge the collar engagement end toward the center of the sleeve.

35. The apparatus for retrieving marine cable according to claim 34, wherein the collar encounter end has an engagement surface which faces toward the forward end of the sleeve and is functional to align with the collar engagement surface when the biasing mechanism is engaged with the collar.

36. The apparatus for retrieving marine cable according to claim 34, wherein:
(a) the biasing mechanism includes a plurality of levered members and biasing forces; and
(b) a plurality of pivots are located around the circumference of the sleeve.

37. The apparatus for retrieving marine cable according to claim 34, further comprising a biasing mechanism friction reduction means for reducing friction between the collar encounter end and the cable.

38. The apparatus for retrieving marine cable according to claim 34, wherein the collar encounter end has an alignment surface, the alignment surface faces the cable and rides upon the cable whereby the alignment surface acting under the influence of the biasing force is functional to align the cable within the sleeve so that the collar encounter arm can encounter the collar attached to the cable.

39. The apparatus for retrieving marine cable according to claim 38, further comprising a roller, the roller is located on the alignment surface to reduce friction between the cable and the alignment surface.

40. The apparatus for retrieving marine cable according to claim 38, wherein:
(a) the biasing force is located on the outside of the sleeve adjacent to the adjacent pivot; and
(b) the bias arm extends above the sleeve to connect to the biasing force.

41. The apparatus for retrieving marine cable according to claim 38, further comprising:
(a) wherein the biasing force is located on the outside of the sleeve adjacent to the pivot;
(b) an opening located through the sleeve adjacent to the biasing force whereby the bias arm extends through the opening to connect between the levered arm and the biasing force; and
(c) the portion of the bias arm extending outside of the opening to connect to the biasing force is functional to prevent the outside portion of the bias arm from entering the opening thereby jamming the biasing mechanism.

42. The apparatus for retrieving marine cable according to claim 41, further comprising guards located adjacent to the biasing force and the bias arm, the guards are functional to protect the bias arm and the biasing force from interference of objects floating in the water and from getting tangled with the line.

43. The apparatus for retrieving marine cable according to claim 42, wherein the pivot is located on the guards.

44. An apparatus for retrieving marine cable on board a ship which reduces a longitudinal tension force on the cable at a cable storage reel when the cable storage reel is winding up the cable, comprising:
(a) a collar attached to the cable at a location where the collar is functional to absorb the longitudinal tension force of the cable trailing behind the collar;
(b) a cable retrieval tool which encircles the cable;
(c) a biasing mechanism which is a part of the cable retrieval tool and is functional to allow movement of the cable retrieval tool along the cable in a direction away from the cable storage reel and over the collar and movement toward the storage reel until the biasing mechanism encounters the collar; and (d) a line attached between the ship and a forward end of the cable retrieval tool, the forward end being the end of the cable retrieval tool which faces the cable storage reel, the line is operative to apply a tension force on the cable retrieval tool such that tension applied on the line pulls the cable retrieval tool toward the ship causing the biasing mechanism to engage the collar, and by applying a large enough additional tension force on the line, an opposing force is placed on the collar which is greater than the longitudinal tension force on the cable trailing behind the collar, the larger opposing force on the line pulls the collar toward the ship creating an isolated portion of cable between the cable retrieval tool and the cable storage reel whereby the longitudinal tension force on the cable at the cable storage reel is reduced so that the isolated portion of cable can be wound on the reel.

* * * * *